(12) United States Patent
Tanaka

(10) Patent No.: US 6,789,433 B2
(45) Date of Patent: Sep. 14, 2004

(54) PURGE GAS SENSOR

(75) Inventor: Martin L. Tanaka, Ronceverte, WV (US)

(73) Assignee: ABB Inc., Norwalk, CT (US)

( * ) Notice: Subject to any disclaimer, the term of this patent is extended or adjusted under 35 U.S.C. 154(b) by 0 days.

(21) Appl. No.: 10/092,773

(22) Filed: Mar. 7, 2002

(65) Prior Publication Data

US 2003/0167856 A1 Sep. 11, 2003

(51) Int. Cl.[7] .................................................. G01F 1/37
(52) U.S. Cl. ................................ 73/861.52; 73/861.42
(58) Field of Search ........................ 73/861.52, 861.42, 73/861.56, 861.63, 861.64

(56) References Cited

U.S. PATENT DOCUMENTS

| | | | | |
|---|---|---|---|---|
| 4,662,798 A | * | 5/1987 | Fassbinder | 406/14 |
| 4,926,698 A | * | 5/1990 | Owen | 73/861.61 |
| 5,763,764 A | * | 6/1998 | Mieczkowski et al. | 73/861.42 |
| 6,164,142 A | * | 12/2000 | Dimeff | 600/538 |
| 6,314,821 B1 | * | 11/2001 | Allan | 73/861.52 |
| 6,446,513 B1 | * | 9/2002 | Henderson | 73/861.52 |

* cited by examiner

*Primary Examiner*—Harshad Patel
(74) *Attorney, Agent, or Firm*—Michael M. Rickin, Esq.

(57) ABSTRACT

A flow sensor for an analytical instrument. The flow sensor can be used to detect the flow of a fluid such as purge gas in the instrument. The sensor can measure the fluid flow at an opening of the instrument enclosure. The sensor has first and second differential pressure switches connected in series. The sensor has a sealed chamber which is in the opening. Bordering the sealed chamber are first and second restrictors through which the fluid can flow. A sensing tube transfers the pressure in the sealed chamber to the first and second switches.

22 Claims, 5 Drawing Sheets

Figure 1 – Prior Art

PURGE GAS SENSOR

FIELD OF THE INVENTION

This invention relates to instruments such as analytical instruments for example gas chromatographs that are used in hazardous atmospheres and more particularly to a flow sensor for use in such an instrument to detect purge gas.

DESCRIPTION OF THE PRIOR ART

Gas chromatographs and other analytical instruments used in hazardous atmospheres are a potential source of explosions. Electrical arcs, sparks, and hot surfaces can cause explosions in the presence of a flammable substance and an oxidizer.

In 1977 CENELEC established EN 50014 as a general set of standards to protect against explosions in potentially explosive atmospheres. Further information about EN 50 014 may be found in the publication of the Technical Committee CENELEC TC 31 entitled "Electrical apparatus for potentially explosive atmospheres General requirements" dated June 1997 and published by the CENELEC Central Secretariat, Rue de Stassart 35, B-1050 Brussels, Belgium. In addition, CENELEC also established EN 50016 to define the use of purged and pressurized equipment as a means of protection.

In 1994 the European Parliament and the Council of the European Union Community enacted Directive 94/9/EC, otherwise known as ATEX, to regulate equipment used in potentially explosive atmospheres. The ATEX Directive requires compliance with the latest CENELEC standards. In 1995, a European harmonized standard was developed and EN 50016 was revised to the current second edition. The second edition of EN 50016 can be found in the publication of SC31-7 of the Technical Committee CENELEC TC 31 entitled "Electrical apparatus for potentially explosive atmospheres—Pressurized apparatus 'p'" dated October 1995 and published by the CENELEC Central Secretariat.

The first edition of EN 50016 did not allow purging of an enclosure as a means of protection if any source of release of flammable gases was present. The second edition of EN 50016 recognized limited sources of release as potentially safe if certain measures are taken. A dilution area must be established around the potential source of release and no source of ignition can be present. Additionally, the purge flow rate and flow path must be adequate to keep the concentration of flammable gases below 25% of the lower explosive limit.

As is shown in FIG. 1, only using a differential pressure switch 14 that senses overpressure does not ensure that the purge gas is passing through the enclosure 11 and providing an effective purge. Purge gas may leak out near the enclosure inlet 10 and the concentration of flammable gases could increase to a dangerous level. In order to prevent this condition, the second edition of EN 50016 requires in section 5.7 that gas flow be monitored at the enclosure outlet 12. The purge gas flow sensor of the present invention provides an effective, inexpensive and reliable way to meet this requirement.

SUMMARY OF THE INVENTION

The present invention is an instrument that has an enclosure that has an opening through which a fluid can flow. The instrument also has first and second differential pressure switches. The instrument further has a sealed chamber in the opening. The chamber has only one inlet, an outlet and only one path between the only one inlet and the outlet through which the fluid can flow. The sealed chamber also has first and second restrictors through which the fluid can flow; and means for transferring the pressure in the sealed chamber to the first and second differential pressure switches, the pressure in the enclosure to the first switch and the pressure at the sealed chamber outlet to the second switch.

The present invention is also a flow sensor for use in an instrument. The flow sensor has first and second differential pressure switches and a sealed chamber. The sealed chamber has only one inlet and an outlet through which a fluid can flow and only one path between the only one inlet and the outlet; a flow restrictor in the only one inlet and a flow restrictor in the outlet; and means for transferring the pressure in the sealed chamber to the first and second differential pressure switches.

The present invention is also a flow sensor for use in an instrument. The flow sensor has a sealed chamber. The sealed chamber has only one inlet, an outlet and only one path between the inlet and the outlet through which the fluid can flow; a flow restrictor in the only one inlet and a flow restrictor in the outlet; and means for transferring the pressure in the sealed chamber to first and second differential pressure switches.

The present invention is also the combination of an instrument that has an enclosure having an opening through which a fluid can flow and a flow sensor. The flow sensor has first and second differential pressure switches; and a sealed chamber in the opening, with the chamber having only one inlet, an outlet and only one path between the only one inlet and the outlet through which the fluid can flow. The sealed chamber has first and second restrictors through which the fluid can flow; and means for transferring the pressure in the sealed chamber to the first and second differential pressure switches, the pressure in the enclosure to the first switch and the pressure at the sealed chamber outlet to the second switch.

The present invention is further an instrument that has an enclosure having an opening through which a fluid can flow. The instrument also has a first pressure transducer in the enclosure and a second pressure transducer outside of the enclosure. The instrument further has a sealed chamber in the opening and the chamber has only one inlet, an outlet and only one path between the only one inlet and the outlet through which the fluid can flow. The sealed chamber has first and second flow restrictors through which the fluid can flow. The chamber also has means for transferring the pressure in the sealed chamber to the first and second pressure transducers. The chamber further has means connected to the first and second pressure transducers for calculating for any given rate of flow of the fluid through the sealed chamber the flow through the outlet.

The present invention is a method for detecting the flow of a fluid through an enclosure having an outlet device through which the fluid can flow. The outlet device has a sealed chamber with only one inlet, an outlet, only one path between the only one inlet and the outlet through which the fluid can flow and a flow restrictor in the only one inlet and a flow restrictor in the outlet through which the fluid can flow. The method transfers the pressure in the sealed chamber to first and second differential pressure switches; transfers the pressure in the enclosure to the first switch; and transfers the pressure outside of the enclosure to the second switch.

DESCRIPTION OF THE PREFERRED EMBODIMENT(S)

Figure 1:
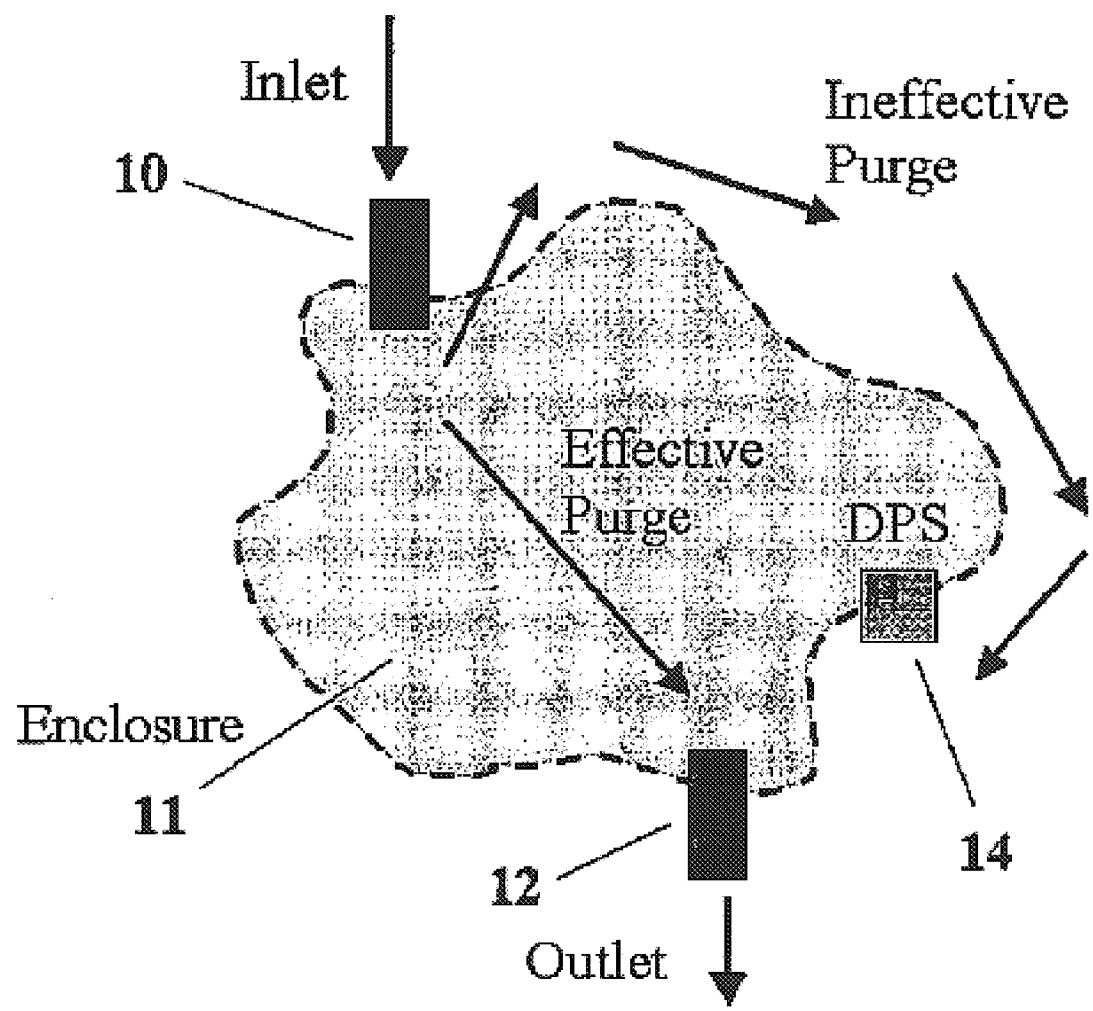
FIG. 1 shows that a single differential pressure switch is unable to ensure an effective purge gas flow path.
Figure 2:
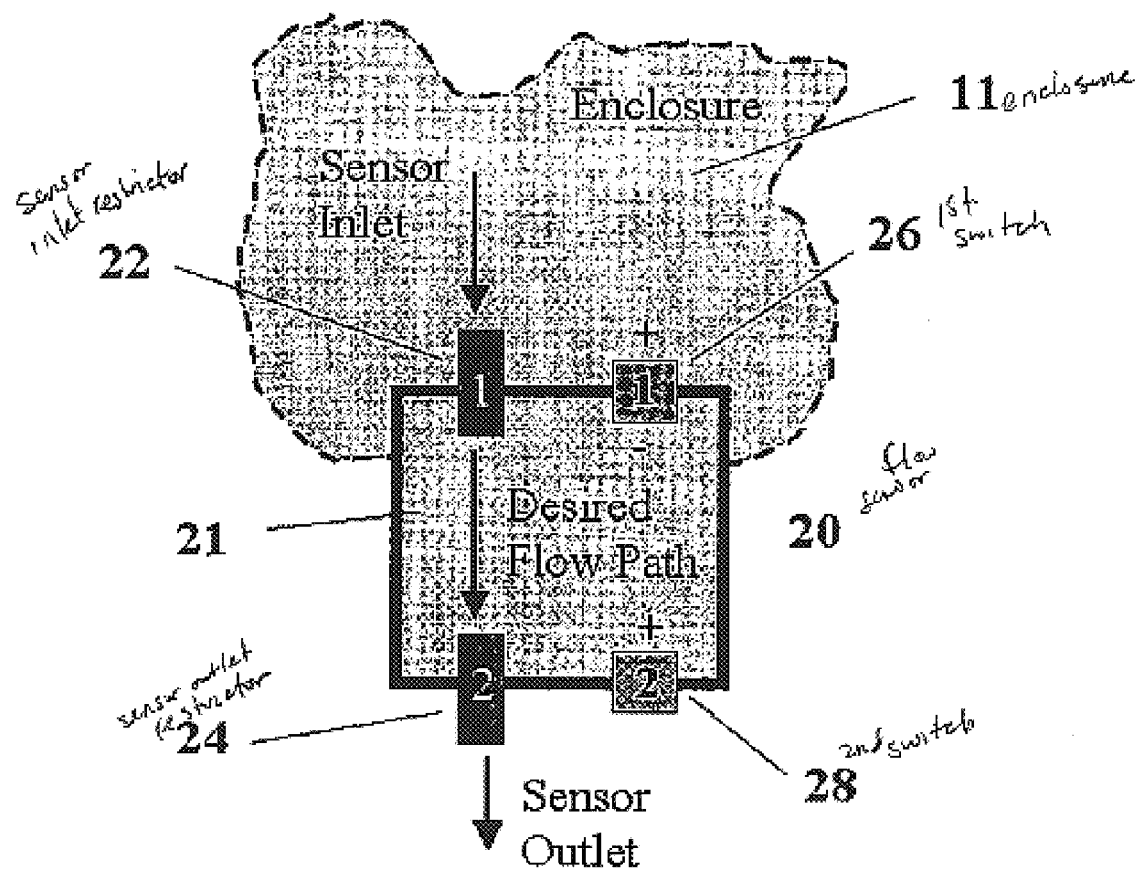
FIG. 2 shows the purge gas flow sensor of the present invention.

The purge gas flow sensor of the present invention utilizes differential pressure and detects the flow of purge gas electronically and operates at very low pressures. Referring now to FIG. 2 there is shown the purge gas flow sensor 20 at the outlet of an enclosure 11. The sensor 20 has a sensor inlet restriction 22, a sensor outlet restriction 24 and first and second differential pressure switches (DPSs) 26 and 28.

Figure 3:
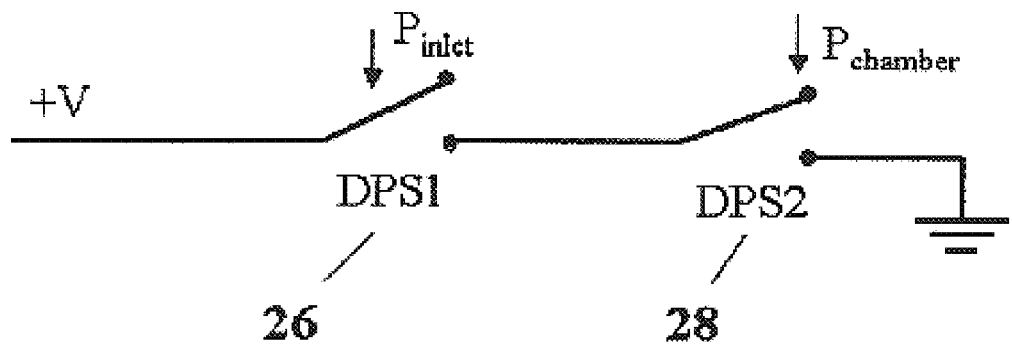
FIG. 3 shows the circuit diagram for the purge gas flow sensor of the present invention.

As is shown in the circuit diagram of FIG. 3 the two DPSs 26 and 28 are connected in the embodiment of the present invention shown in that Figure in series. As can be appreciated the DPSs 26 and 28 may be connected in another configuration. If either DPS 26 or DPS 28 is open the series circuit is opened and the sensor 20 detects the lack of purge gas outlet flow from sensor 20.

The sensor 20 ensures flow through the outlet of the enclosure 11 by utilizing a sealed chamber. If the sensor inlet restriction 22 is obstructed or blocked, the flow through the purge gas sensor 20 is reduced or eliminated. This reduces the pressure drop across the sensor outlet restriction 24 to a level that is below the actuation pressure of DPS 28. Since the two DPSs 26 and 28 are wired in series, the circuit opens and the lack of outlet flow is detected and thus sensor 20 meets the requirement of EN 50016 second edition as set forth in section 5.7 of that EN that the gas flow be monitored at the outlet of the enclosure 11.

Similarly, if the sensor outlet restriction 24 is obstructed or blocked, the flow through the purge gas sensor 20 is again reduced or eliminated. This reduces the pressure drop across the sensor inlet restriction 22 to a level that is below the actuation pressure of DPS 26. Once again, the circuit opens and the lack of flow is detected.

The operation of DPSs 26 and 28 is summarized in the

| Condition | Chamber Pressure | DPS1 | DPS2 | Circuit |
| --- | --- | --- | --- | --- |
| Both Restrictions Open | P/2 | Closed | Closed | Closed |
| Restriction 22 Blocked | Atm | Closed | Open | Open |
| Restriction 24 Blocked | P | Open | Closed | Open |

It should be appreciated that the restrictor pair 22, 24 also meets the requirement for a spark and particle barrier.

Figure 4:
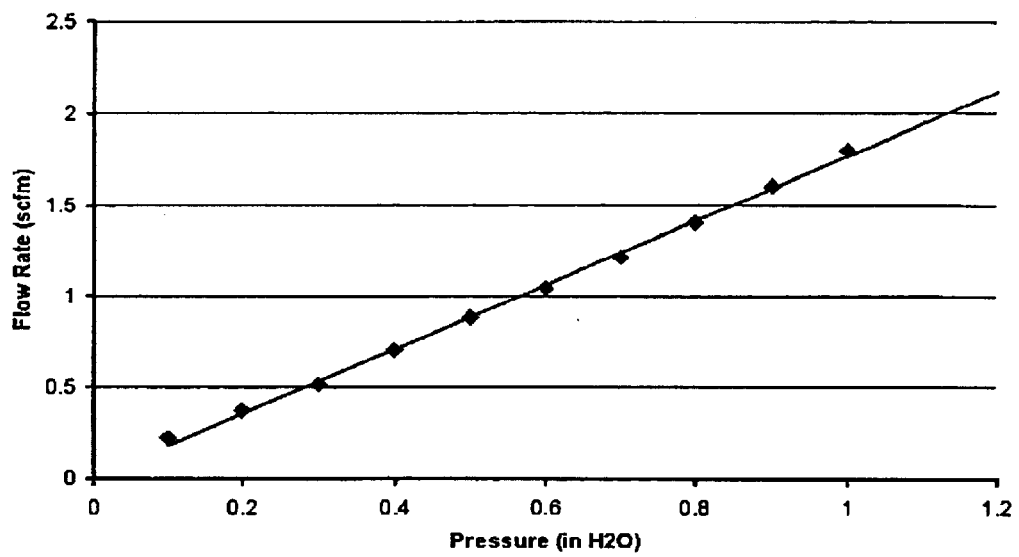
FIG. 4 shows that the flow through a flow restrictor is proportional to the restrictor pressure drop.

FIG. 4 shows that the flow through restrictor 22, 24 is directly proportional to the pressure drop across the restrictor. As a result, the quantity of flow can be determined by the pressure developed.

Figure 5:
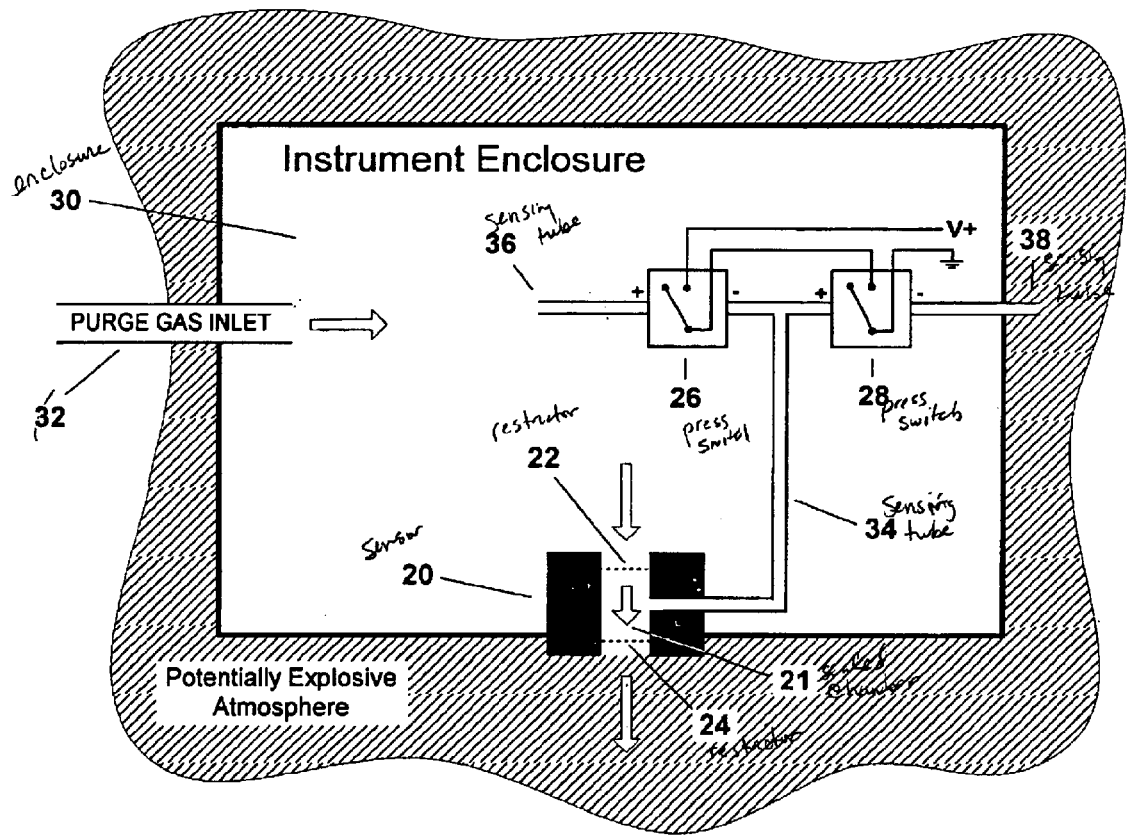
FIG. 5 shows a simplified block diagram of the flow sensor incorporated in an instrument.

Referring now to FIG. 5 there is shown a simplified block diagram that shows the sensor 20 of the present invention incorporated in the enclosure 30 of an instrument which may be an analytical instrument such as for example a gas chromatograph. The enclosure 30 has a purge gas inlet 32. The flow sensor 20 is installed at the outlet of the enclosure.

The purge gas flows through restrictor 22 and drops in pressure as it enters the sealed chamber 21 of sensor 20. Next the gas flows through restrictor 24 and the pressure drops to the pressure outside of the instrument. A sensing tube 34 transfers the pressure in the sealed chamber 21 to the two DPSs 26, 28. A sensing tube 36 transfers the pressure in the enclosure to DPS 26 and a sensing tube 38 transfers the pressure outside of enclosure 30 to DPS 28.

The first DPS 26 is a normally open switch that closes when the difference between the enclosure pressure (sensed by tube 36) and the pressure in the sealed chamber 21 is greater than the switch actuation pressure. Similarly, the second DPS 28 is also a normally open switch that closes when the difference between the pressure in the sealed chamber 21 and the pressure outside of the instrument enclosure 30 (sensed by tube 38) is greater than the switch actuation pressure.

The restrictors 22 and 24 can be any type of device that provides flow restriction. In one embodiment for sensor 20 the restrictors 22, 24 were embodied as a screen cut into a circle. As can be appreciated by those of ordinary skill in the art the restrictors 22, 24 can also be embodied as sintered metal or by any other device that can provide flow restriction.

It should be appreciated that the flow sensor of the present invention can be used to:

1. sense the presence of flow as long as the DPS actuation pressure is any value lower than the pressure differentials developed; and
2. sense the quantity of flow by either:
   a) selecting the resistance to flow of the restrictors 22, 24 so that the pressure drop for a given flow rate matches the actuation pressure of the DPS 26, 28; or
   b) setting the DPS actuation point so that it matches the pressure drop created by the restrictor 22, 24 for a given flow rate.

When the restrictors 22, 24 are each embodied by a screen cut into a circle, different screen mesh densities may be used to alter the performance of the device to achieve items 1 and 2 above. Different actuation pressure setpoints for the DPSs 26, 28 may be used to alter device performance to achieve items 1 and 2 above.

Figure 6:
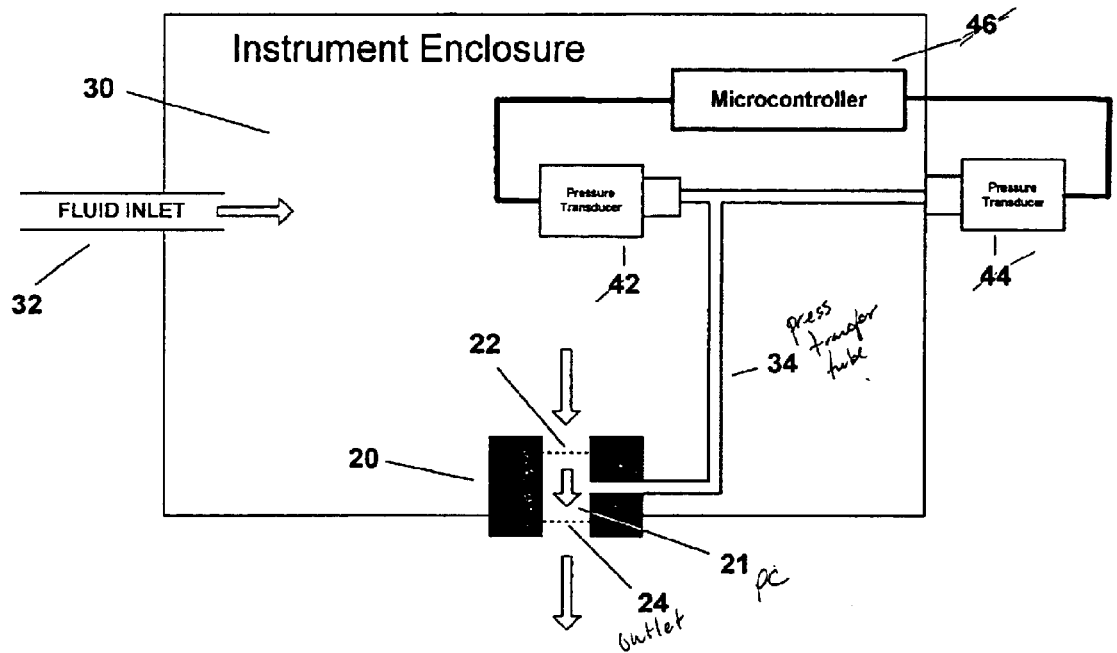
FIG. 6 shows the use of a pressure transducer to sense the quantity of flow.

It should further be appreciated that pressure transducers 42 and 44 can be used to measure the quantity of flow as shown in FIG. 6. In this application, for any given flow rate, the pressure in the chamber 21 can be sensed by the transducers 42, 44 and the flow through the outlet 24 calculated. Unlike switches with a single set-point, the transducer 42, 44 is capable of measuring a continuum of pressures and thus allowing the present flow value to be determined. The output of the pressure transducer 42, 44 and the calculation of flow may be determined by utilizing a microcontroller or microprocessor 46. As is well known to those of ordinary skill in the art, transducer 42 senses the difference in pressure between the enclosure pressure and the sealed chamber pressure and transducer 44 senses the difference in pressure between the sealed chamber pressure and the pressure outside of the enclosure.

Figure 7:
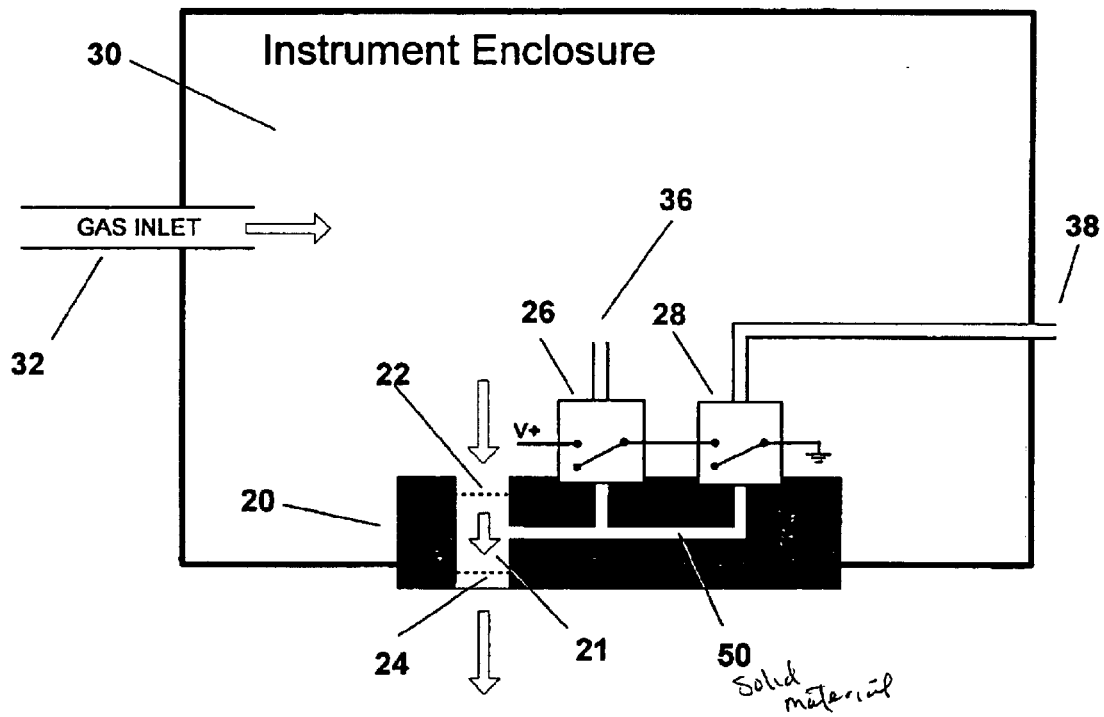
FIG. 7 shows a passage through a solid material as an alternative to the sensing tube.
Figure 8:
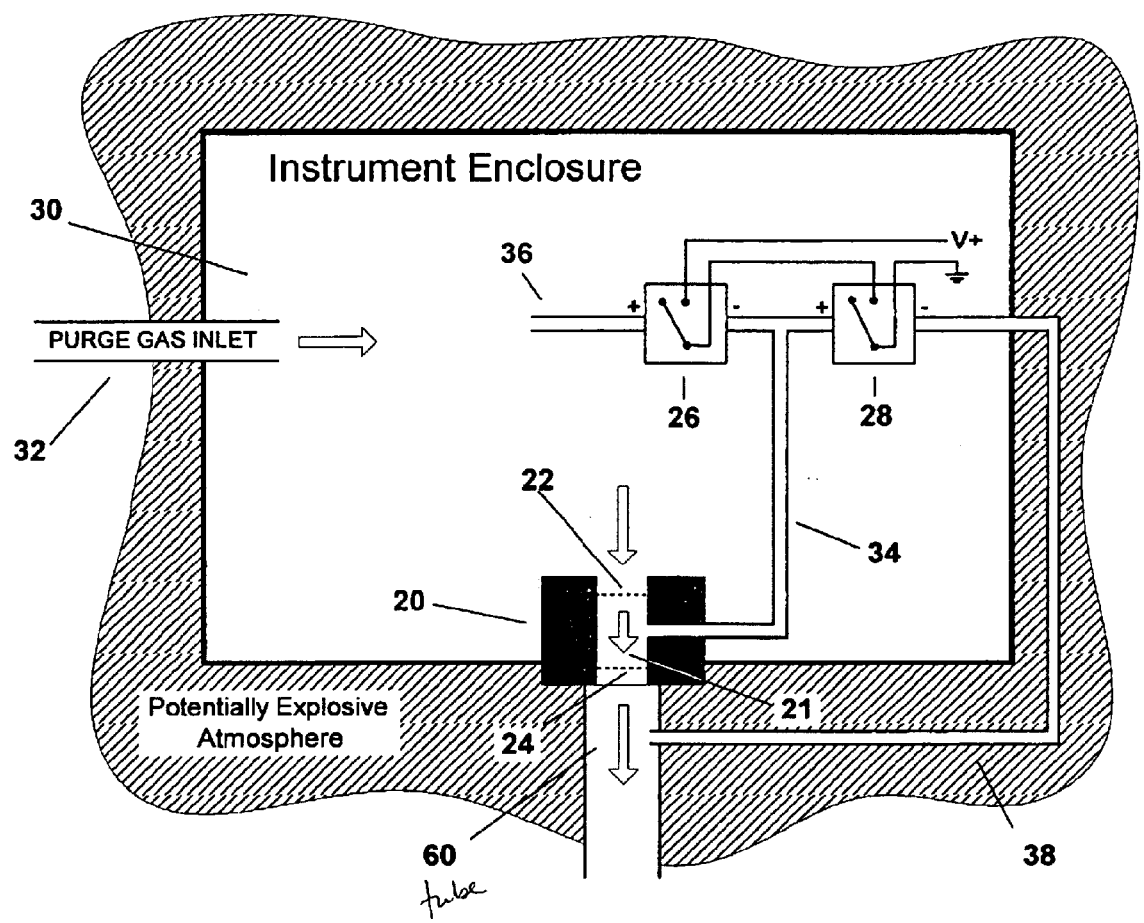
FIG. 8 shows a tube connected to the outlet of the instrument.

It should also be further appreciated that:

1. the pressure transfer tube 34 of FIGS. 5 and 6 may also be a passage through a solid material 50 or any other means to transfer the pressure in the sealed chamber 21 of sensor 20 as shown in FIG. 7.
2. the ends of sensor 20 may be threaded to attach to an outlet pipe or tube 60 as shown in FIG. 8. The sensing tube 38 of FIG. 5 that was connected to the atmosphere is now connected to the outlet pipe or tube 60; and
3. the sensor 20 may be used to measure the flow of water or other fluids where as used herein fluids means liquids or gases.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for detecting a blockage in the outlet of a purged enclosure having an outlet monitoring device in said outlet, said outlet monitoring device having a sealed chamber with only one inlet, an outlet, only one path between said only one inlet and said outlet and a flow restrictor in said only one inlet and a flow restrictor in said outlet through which a purging fluid can flow, said method comprising:

flowing said purging fluid into said enclosure;

monitoring at a first differential pressure switch the difference in pressure between the pressure in said enclosure and said sealed chamber that results from said purging fluid flow through said first restrictor of said outlet device;

monitoring at a second differential pressure switch the difference in pressure between said sealed chamber pressure and the pressure outside of said enclosure that results from said purging fluid flow through said second restrictor of said outlet device; and determining that either said first or second restrictors are blocked when said second or said first switches, respectively, are open when said purging fluid flows.

2. The method of claim 1 further comprising determining that said purging fluid flow is passing through said outlet device and not leaking out of said enclosure in another location if both of said differential pressure switches are closed.

3. An instrument comprising:

(a) an enclosure having an opening through which a fluid can flow;

(b) first and second differential pressure switches; and (c) a sealed chamber in said opening, said chamber having only one inlet, an outlet and only one path between said only one inlet and said outlet through which said fluid can flow and comprising:

(i) first and second restrictors through which said fluid can flow; and (ii) means for transferring the pressure in said sealed chamber to said first and second differential pressure switches, the pressure in said enclosure to said first switch and the pressure at said sealed chamber outlet to said second switch;

each of said first and second differential pressure switches having a predetermined actuation pressure and each of said first and second restrictors having a resistance to flow selected so that the pressure drop across said first restrictor for a given rate of fluid flow through said first restrictor matches the predetermined actuation pressure of said first switch and the pressure drop across said second restrictor for a given rate of fluid flow through said second restrictor matches the predetermined actuation pressure of said second switch.

4. The instrument of claim 3 wherein said first and second differential pressure switches are inside said enclosure.

5. The instrument of claim 3 wherein said means for transferring said pressure is a first tube for transferring said pressure in said chamber to switches, a second tube for transferring said enclosure pressure to said first switch and a third tube for transferring said sealed chamber outlet pressure to said second switch.

6. The instrument of claim 3 wherein said first and second differential pressure switches are connected in series.

7. The instrument of claim 3 wherein said sealed chamber outlet is threaded for attachment to an outlet pipe.

8. An instrument comprising:

(a) an enclosure having an opening through which a fluid can flow;

(b) first and second differential pressure switches; and (c) a sealed chamber in said opening, said chamber having only one inlet, an outlet and only one path between said only one inlet and said outlet through which said fluid can flow and comprising:

(i) first and second restrictors through which said fluid can flow; and (ii) means for transferring the pressure in said sealed chamber to said first and second differential pressure switches, the pressure in said enclosure to said first switch and the pressure at said sealed chamber outlet to said second switch;

each of said first and second differential pressure switches having a settable actuation pressure and said first pressure switch settable actuation pressure is set to match the pressure drop through said first restrictor for a given rate of fluid flow through said first restrictor and said second pressure switch settable actuation pressure is set to match the pressure drop through said second restrictor for a given rate of fluid flow through said second restrictor.

9. The instrument of claim 8 wherein said first and second differential pressure switches are inside said enclosure.

10. The instrument of claim 8 wherein said means for transferring said pressure is a first tube for transferring said pressure in said chamber to switches, a second tube for transferring said enclosure pressure to said first switch and a third tube for transferring said sealed chamber outlet pressure to said second switch.

11. The instrument of claim 8 wherein said first and second differential pressure switches are connected in series.

12. The instrument of claim 8 wherein said sealed chamber outlet is threaded for attachment to an outlet pipe.

13. In combination:

(A) an instrument comprising an enclosure having an opening through which a fluid can flow;

(B) a flow sensor comprising:

(i) first and second differential pressure switches; and (ii) a sealed chamber in said opening, said chamber having only one inlet, an outlet and only one path between said only one inlet and said outlet through which said fluid can flow and comprising:

(a) first and second restrictors through which said fluid can flow; and (b) means for transferring the pressure in said sealed chamber to said first and second differential pressure switches, the pressure in said enclosure to said first switch and the pressure at said sealed chamber outlet to said second switch each of said first and second differential pressure switches having a predetermined actuation pressure and each of said first and second restrictors having a resistance to flow selected so that the pressure drop across said first restrictor for a given rate of fluid flow through said first restrictor matches the predetermined actuation pressure of said first switch and the pressure drop across said second restrictor for a given rate of fluid flow through said second restrictor matches the predetermined actuation pressure of said second switch.

14. The combination of claim 13 wherein said instrument is an analytical instrument.

15. The combination of claim 13 wherein said first and second differential pressure switches are connected in series.

16. The combination of claim 13 wherein said sealed chamber outlet is threaded for attachment to an outlet pipe.

17. The combination of claim 13 wherein said sealed chamber outlet vents to atmosphere and said sealed chamber outlet pressure is the pressure of said atmosphere.

18. In combination:
(A) an instrument comprising an enclosure having an opening through which a fluid can flow;
(B) a flow sensor comprising:
(i) first and second differential pressure switches; and
(ii) a sealed chamber in said opening, said chamber having only one inlet, an outlet and only one path between said only one inlet and said outlet through which said fluid can flow and comprising:
(a) first and second restrictors through which said fluid can flow; and
(b) means for transferring the pressure in said sealed chamber to said first and second differential pressure switches, the pressure in said enclosure to said first switch and the pressure at said sealed chamber outlet to said second switch each of said first and second differential pressure switches have a settable actuation pressure and said first pressure switch settable actuation pressure is set to match the pressure drop through said first restrictor for a given rate of fluid flow through said first restrictor and said second pressure switch settable actuation pressure is set to match the pressure drop through said second restrictor for a given rate of fluid flow through said second restrictor.

19. The combination of claim 18 wherein said instrument is an analytical instrument.

20. The combination of claim 18 wherein said first and second differential pressure switches are connected in series.

21. The combination of claim 18 wherein said sealed chamber outlet is threaded for attachment to an outlet pipe.

22. The combination of claim 18 wherein said sealed chamber outlet vents to atmosphere and said sealed chamber outlet pressure is the pressure of said atmosphere.

* * * * *